May 6, 1930.  H. MORGAN ET AL  1,757,917
TROUBLE FINDER
Filed May 14, 1928   2 Sheets-Sheet 1
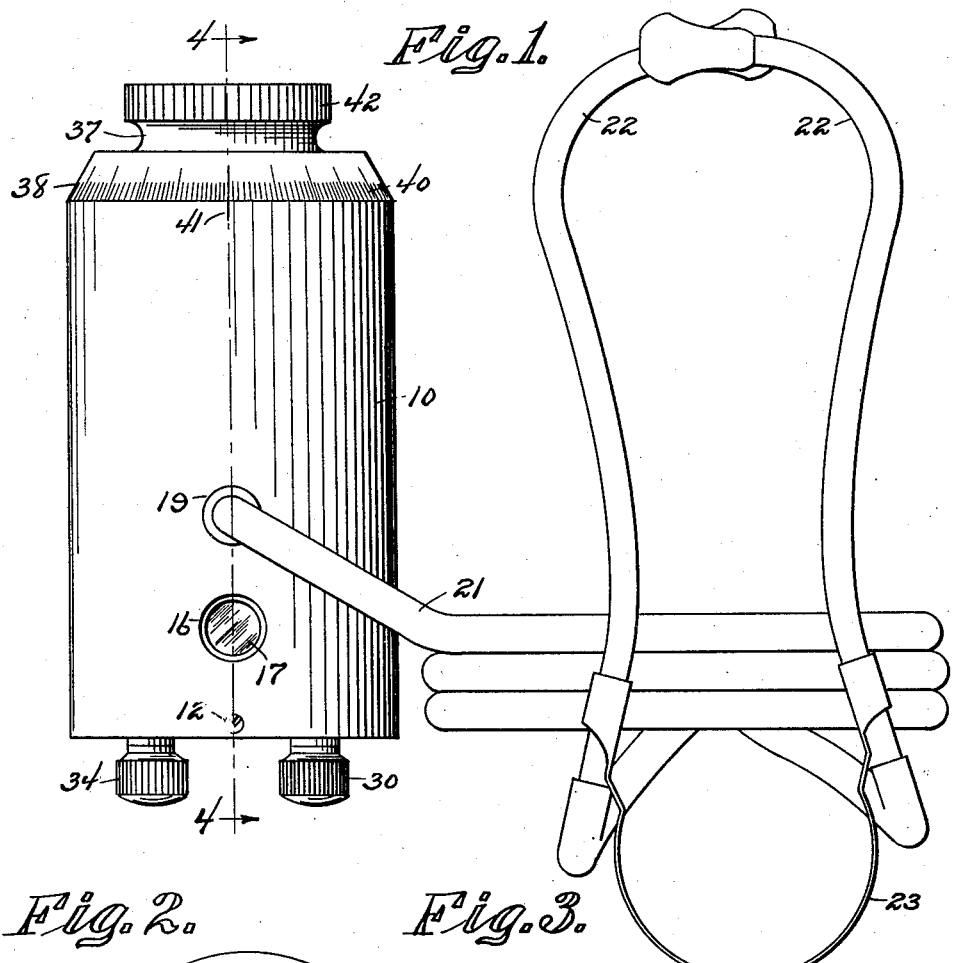
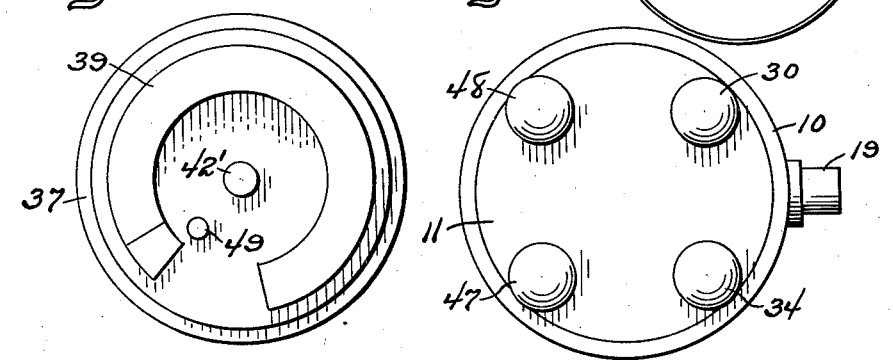
William Stephenson
and Howard Morgan INVENTORS
BY Victor J. Evans
ATTORNEY
WITNESS:

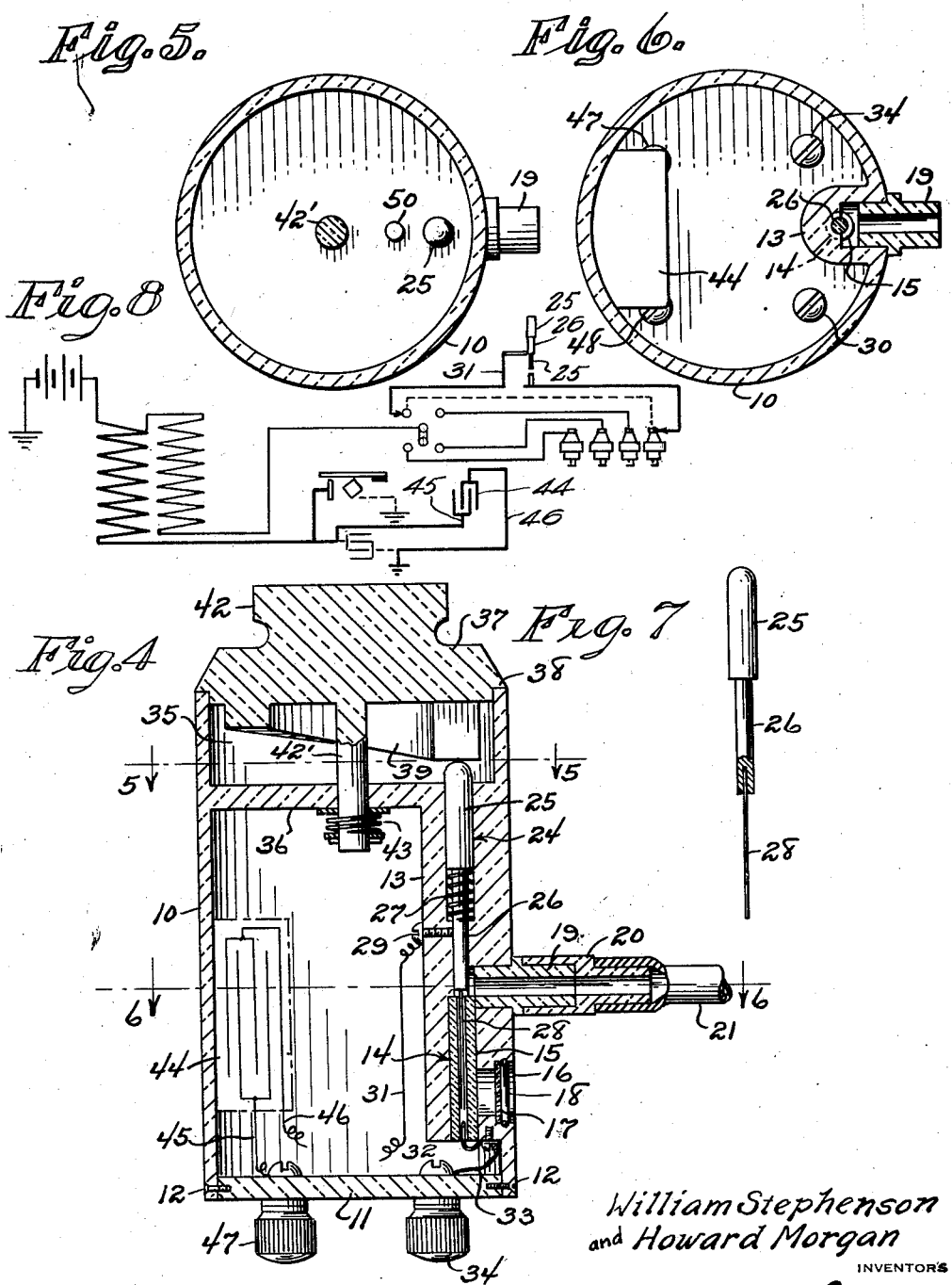

Patented May 6, 1930

1,757,917

UNITED STATES PATENT OFFICE

HOWARD MORGAN AND WILLIAM STEPHENSON, OF ORDWAY, COLORADO, ASSIGNORS, BY DIRECT AND MESNE ASSIGNMENTS, TO THE TUN-A-MOTOR COMPANY, OF ORDWAY, COLORADO, A CORPORATION OF COLORADO

TROUBLE FINDER

Application filed May 14, 1928. Serial No. 277,510.

This invention relates to devices for testing and locating trouble in the ignition systems of internal combustion engines, and has for an object the provision of means whereby the spark in each cylinder of an engine may be balanced in accordance with the compression of the cylinder, means being provided for causing the arc to travel in a straight line so as to insure the greatest amount of accuracy in measuring the spark.

Another object of the invention is the provision of a trouble testing device for an ignition system wherein sound signals produced by the sparks within the device will be delivered through ear pieces with a full even rhythm and will vary only in accordance with the speed of the motor when the latter is operating under proper conditions. In other words, as the intensity and volume of each sound signal is directly dependent upon the strength and intensity of the current, it can be readily understood that any slight variation in the strength or intensity of the current due to trouble in the ignition circuit will produce a change in the sound signals that can be instantly detected.

To obtain the highest degree of efficiency and smoothness of operation in an internal combustion engine, the ignition system must be in perfect balance. In other words, the spark plug in each cylinder should require the same voltage to cause the sparks to jump the gaps between the electrodes. Conditions often exist where the relative resistance at the spark plugs of an engine varies. This variation is frequently due to variations in spark gap settings, or variations in cylinder compression, but may also be due to partly broken down insulation in the high tension circuit between the distributor and spark plugs.

The invention therefore aims to provide means for detecting the cause from which any of the conditions referred to might arise, so that the same may be promptly remedied.

With the above and other objects in view, the invention further includes the following novel features and details of construction, to be hereinafter more fully described, illustrated in the accompanying drawings and pointed out in the appended claims.

In the drawings:—

Figure 1 is an elevation of a testing apparatus constructed in accordance with the invention.

Figure 2 is a bottom plan view of the container cap.

Figure 3 is a bottom plan view of the container.

Figure 4 is a section on the line 4—4 of Figure 1.

Figures 5 and 6 are sections taken respectively on the lines 5—5 and 6—6 of Figure 4.

Figure 7 is a detail view of the adjustable electrode.

Figure 8 is a diagrammatic view illustrating the manner of using the invention.

Referring to the drawings in detail wherein like characters of reference denote corresponding parts, the reference character 10 indicates a container which is made of any suitable insulating material and is provided with a bottom 11 which may be removably secured in place by means of screws 12. Extending longitudinally within the container is a rib 13 having a bore 14 therein, while positioned within this bore is a preferably glass tube 15 of a type to magnify an object within the tube. The container may be of a material suitable for molding, and the tube 15 may be molded or otherwise secured within the bore 14. A sight opening 16 communicates with the bore 14 and this opening is closed by a transparent disk 17 which is preferably of ruby glass. A spring 18 serves to hold the glass in place.

Also communicating with the bore 14 is a thimble 19 and connected to this thimble by means of a coupling 20 is a rubber sound tube 21. Secured to the outer end of this sound tube are ear pieces 22 which are connected by a spring 23, so that the ear pieces will be yieldingly held in position for use.

The rib 13 is also provided with a bore 24 which is in axial alignment with the bore 14 and slidingly mounted in this bore 24 is a plunger 25. The plunger is provided with a reduced extension 26 which operates in a reduced portion of the bore and is yieldingly held against movement in one direction by a spring 27. The reduced extension 26 of the plunger 25 carries an electrode 28 which extends into the upper end of the tube 15.

A binding screw 29 has its inner end in electrical contact with the extension 26 of the plunger 25 and provides means whereby the plunger and its electrode 28 may be connected with the binding post 30 through a conductor 31.

Extending into the opposite end of the tube 15 is a relatively stationary electrode 32 which is connected by a conductor 33 with a binding post 34. The electrodes 28 and 32 are normally spaced apart and their opposed ends are so shaped as to insure proper contact when the electrodes are brought together.

The upper end of the plunger 25 extends into a compartment 35 provided by a partition 36 which forms the bottom of the compartment. The top of the compartment is closed by a cap 37 which is provided with an annular flange 38 for rotation upon the upper edge of the container 10. Extending downward from the cap 37 into the compartment 35 is a circular cam 39 whose lower edge engages the plunger 25, so that by rotating the cap 37, the electrodes 28 and 32 will be spaced in accordance with the position of the cam 39. This may be determined by means of a scale 40 which is arranged upon the beveled periphery of the cap 37, this scale cooperating with an indicator 41. A finger piece 42 is provided in the cap for conveniently rotating the same.

Extending downwardly from the cap through an opening provided in the partition 36 is a post 42 and secured upon this post is a spring 43 so that the flange 38 of the cap will be frictionally held upon the upper edge of the container and will thus remain in adjusted position.

Also housed within the container 10 is a condenser 44 whose opposite terminals are connected by means of conductors 45 and 46 with binding posts 47 and 48. These binding posts and the binding posts 30 and 34 provide means for connecting the device in the ignition circuit. Rotation of the cap 37 is limited by means of a stop 49 which is carried by the cap and a stop 50 which extends upward from the partition 36 in the path of the cap carried stop.

All defects in the ignition system of an internal combustion engine may be divided into two general classes. First: Those defects which occur in the primary circuit, such as defective breaker, defective condenser, weak battery, etc. Second: Those occurring in the secondary circuit, such as break down of the high tension insulation, shorts, etc. The most difficult defects to locate in an ignition system are those of the first class, that is, those occurring in the primary circuit. It should be borne in mind however that all defects in the primary circuit are magnified in the secondary circuit. This is apparent when it is considered that if the induced capacity of the spark coil is ten thousand volts in the secondary circuit, with six volts in the primary circuit, a slight disturbance of voltage in the primary circuit will bring about a greatly magnified variation of the voltage in the secondary circuit regardless of the cause of the disturbance.

The balancing tests are made with the instrument in parallel with each spark plug.

Any piece of high tension insulation may be readily tested for efficiency loss. To make such a test connect the instrument in series with the plug and wire. With the engine operating, find the high point on the scale 40 (which is a millimeter scale) at which the sound signals are unaffected, or occur without breaking. Note the reading and then connect the instrument by eliminating the high tension wire, thus making the test direct from the distributor head to the plug. Take the break down reading and compare with the reading obtained. If the test shows a higher reading when taken across from the distributor head to the plug than when taken in series with the wire and plug, it would show a loss of efficiency due to leakage in the high tension wire.

Since all tests are made with the instrument connected in the secondary circuit, it is evident that the knowledge of the effect of any given trouble in the system would be of material benefit in assisting its identification from the character of the sound signal produced. For example, in pitted breaker points, the surfaces of the points will be found to be very uneven, the surface of one point being covered with projections, while the surface of the other point will contain depressions into which the projections fit when the points are in alignment. As long as the projections and depressions register a fair contact may be obtained and a fairly good spark produced, but the slightest disturbance in the alignment of these points as they open and close (due to looseness in the point bearing or other causes, such as a variation of the cam) will result in a poor contact and a very weak spark.

Therefore, if the trouble is due to pitted breaker points, good and bad sparks will occur irregularly, the bad sparks alternating with the good so as to cause the engine to operate inefficiently. Since any defect in the primary circuit is greatly magnified in the secondary circuit, and since the sound signals are produced and governed by the current in the secondary circuit, the slightest change in the spark produced will be reflected through the sound signals. The device is connected in the ignition circuit through the binding posts 30 and 34.

The condenser may also be tested by connecting the binding posts 47 and 48 across the condenser of the ignition system, while the foregoing tests are being conducted. Also, the condenser of the ignition system may be separately tested by connecting the binding posts 47 and 48 across said condenser with the electrodes 28 and 32 not connected in the ignition circuit.

The invention is susceptible of various changes in its form, proportions and minor details of construction and the right is herein reserved to make such changes as properly fall within the scope of the appended claims.

Having described the invention what is claimed is:

1. In a device for testing the ignition circuits of internal combustion engines, a glass tube within the container, spaced electrodes within the tube for connection in the ignition circuit to provide a spark gap, a sound tube having one of its ends in communication with the glass tube, and an ear piece at the end of the sound tube.

2. In a device for testing the ignition circuits of internal combustion engines, a glass tube within the container, spaced electrodes within the tube for connection in the ignition circuit to provide a spark gap, a sound tube having one of its ends in communication with the glass tube, an ear piece at the end of the sound tube and a sight opening in the container wall in front of the glass tube.

3. In a device for testing the ignition circuits of internal combustion engines, a container, an insulated guide tube therein, an electrode extending into one end of the tube, a spring influenced plunger, an electrode carried by said plunger and extending into the tube and normally spaced from the other electrode to provide a spark gap, means to adjustably position the plunger carried electrode to regulate the space between the electrodes, and sound conveying means in communication with the insulated guide tube.

4. In a device for testing the ignition circuits of internal combustion engines, a container, an insulated guide tube therein, an electrode extending into one end of the tube, a spring influenced plunger, an electrode carried by said plunger and extending into the tube and normally spaced from the other electrode to provide a spark gap, means to adjustably position the plunger carried electrode to regulate the space between the electrodes, and sound conveying means in communication with the insulated guide tube, and means upon the outside of the container to indicate adjustment of the electrodes.

5. In a device for testing the ignition circuits of internal combustion engines, a container, an insulated guide tube therein, an electrode extending into one end of the tube, a spring influenced plunger, an electrode carried by said plunger and extending into the tube and normally spaced from the other electrode to provide a spark gap, a rotatable cap for the container, means carried by the cap and engaging the plunger to adjust the length of the gap between the electrodes, and means to indicate such adjustment.

In testimony whereof we affix our signatures.

HOWARD MORGAN.
WILLIAM STEPHENSON.